Jan. 15, 1952 W. J. KRUSE ET AL 2,582,636
FRUIT PITTER
Filed March 15, 1947 4 Sheets-Sheet 1
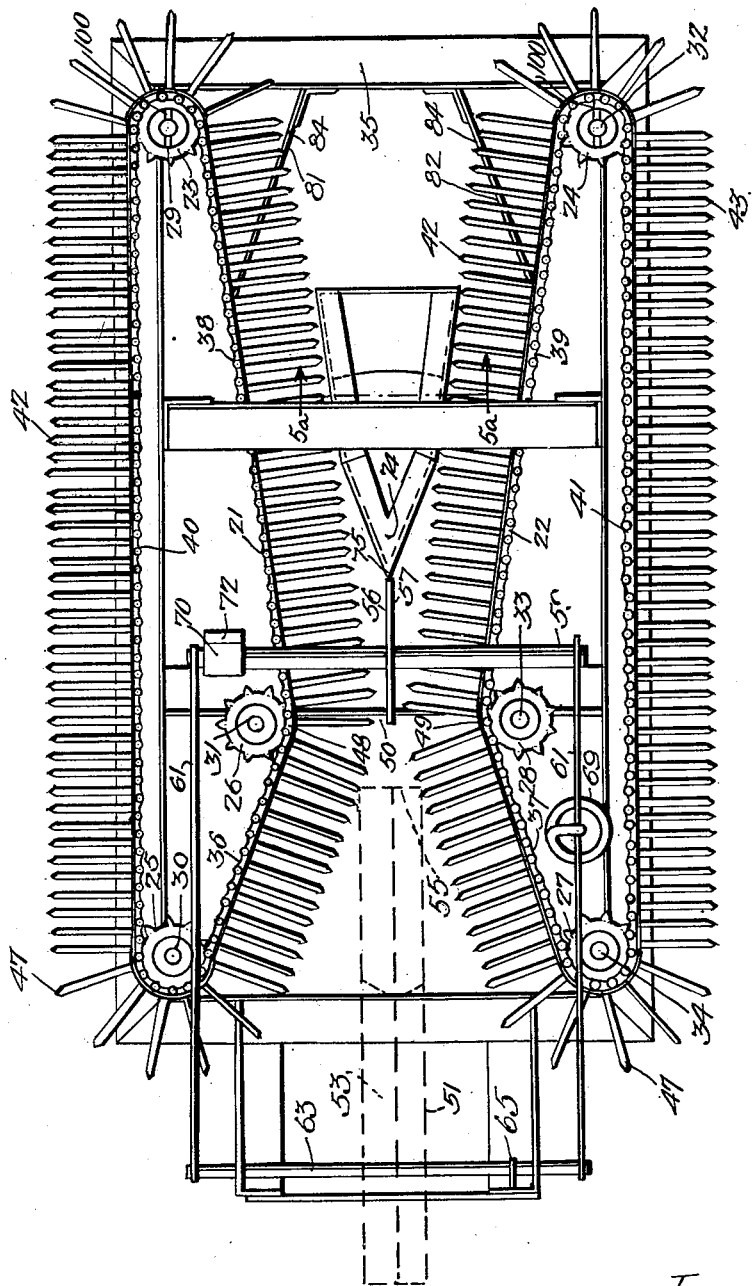
Inventors.
William J. Kruse
Conrad F. Kruse
by
Attorneys.

Jan. 15, 1952 W. J. KRUSE ET AL 2,582,636
FRUIT PITTER
Filed March 15, 1947 4 Sheets-Sheet 2
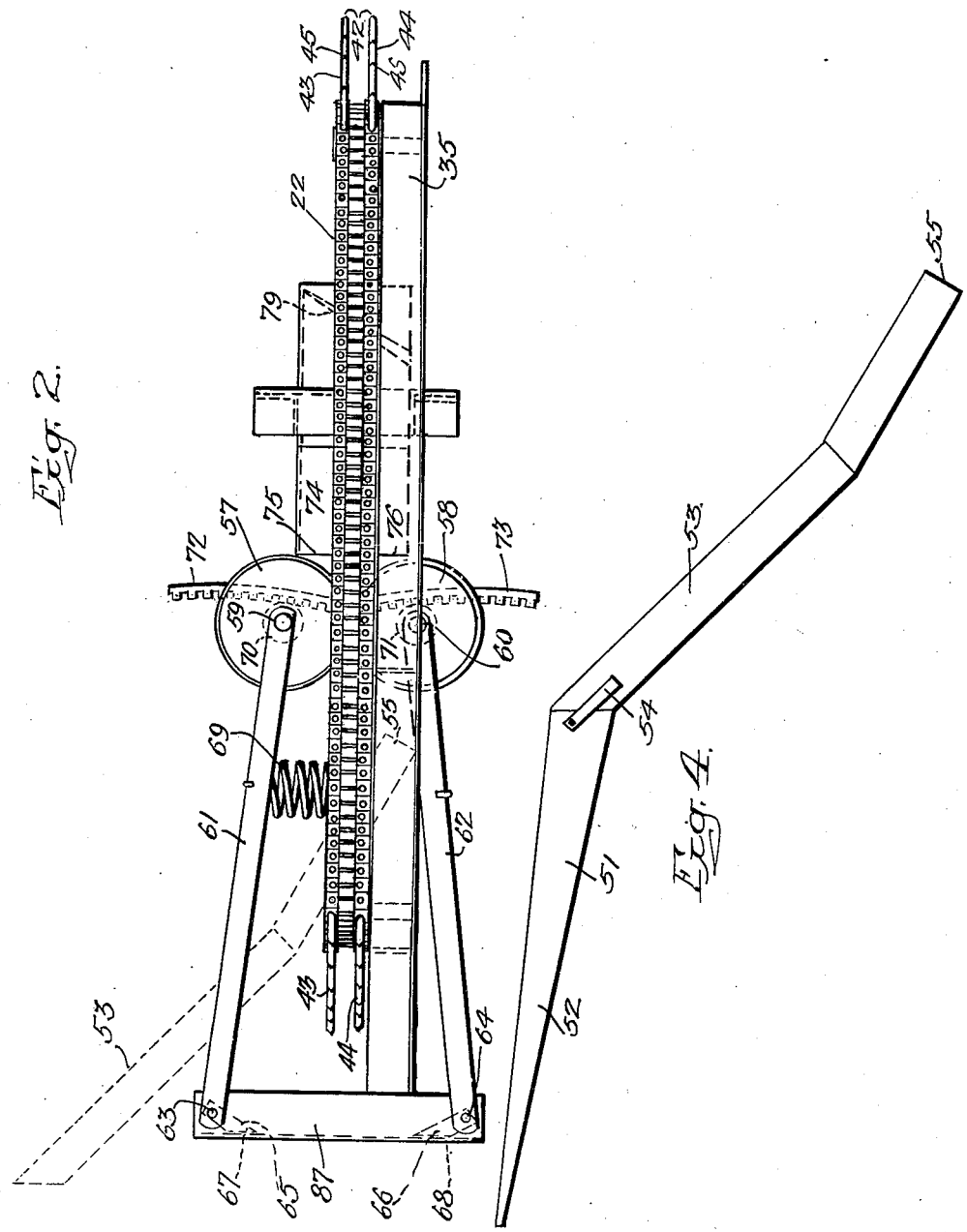
Inventors.
William J. Kruse
Conrad F. Kruse
By
Attorneys.

Jan. 15, 1952   W. J. KRUSE ET AL   2,582,636
FRUIT PITTER
Filed March 15, 1947   4 Sheets-Sheet 3
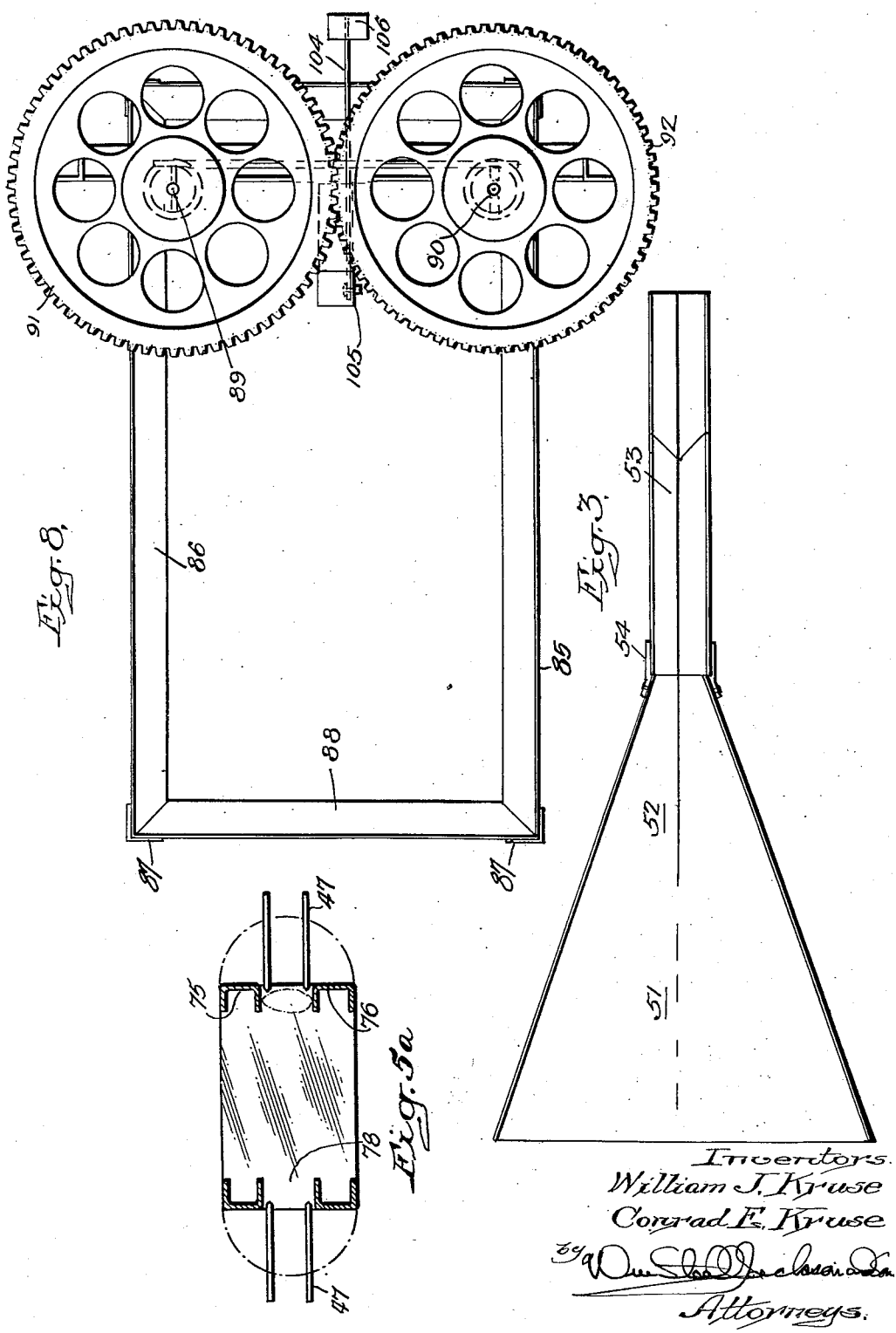

Jan. 15, 1952　　W. J. KRUSE ET AL　　2,582,636
FRUIT PITTER
Filed March 15, 1947　　4 Sheets-Sheet 4
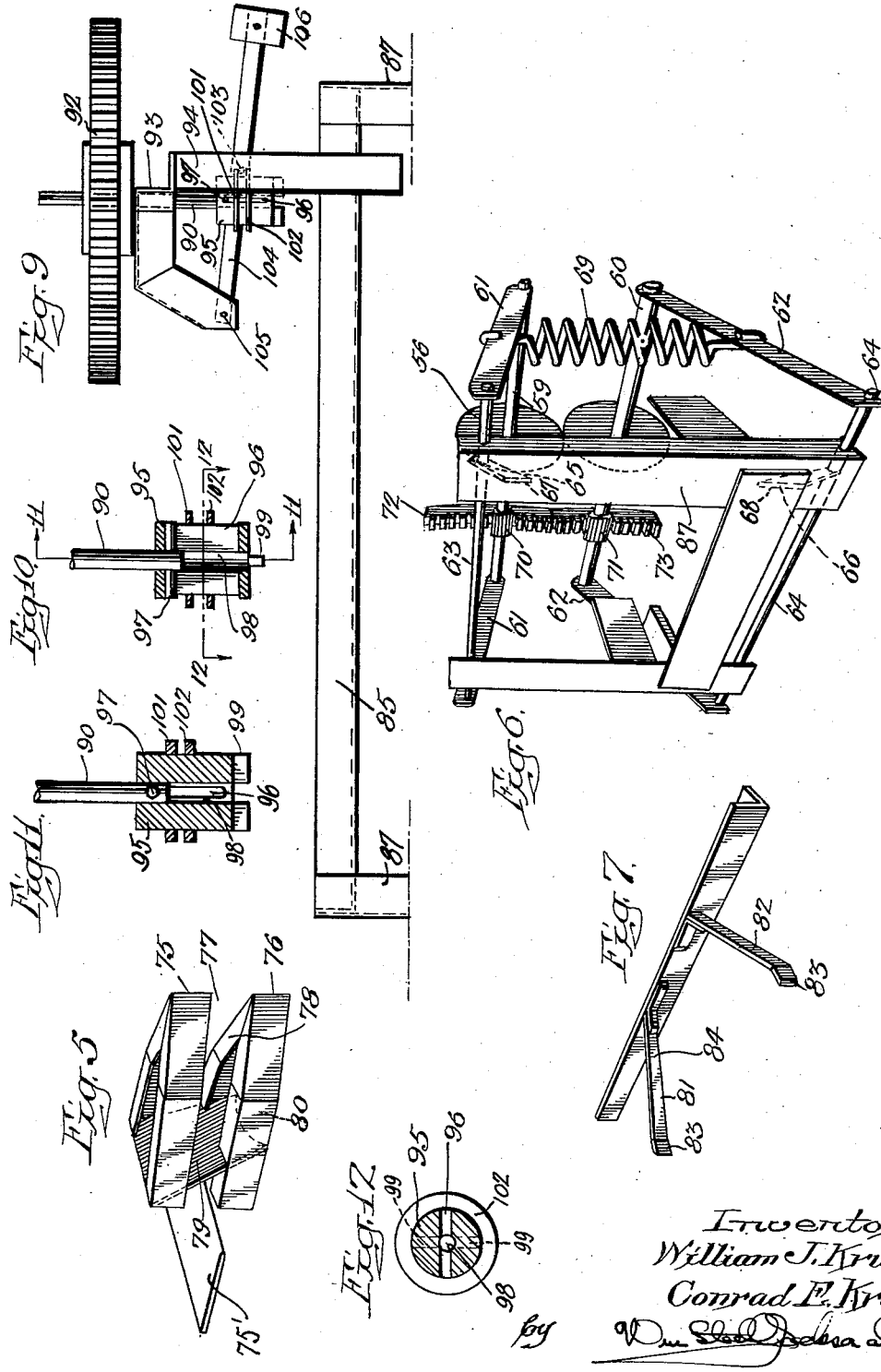
Inventors.
William J. Kruse
Conrad F. Kruse
by
Attorneys.

Patented Jan. 15, 1952

2,582,636

UNITED STATES PATENT OFFICE 2,582,636

FRUIT PITTER

William J. Kruse and Conrad E. Kruse, Hatboro, Pa.

Application March 15, 1947, Serial No. 734,950

1 Claim. (Cl. 146—28)

Our invention relates to processes of pitting fruit and to fruit pitters.

A purpose of our invention is to simplify and cheapen the pitting of fruit of the character of peaches, plums and apricots.

A further purpose is to render fruit pitting very rapid and reliable.

A further purpose is to reduce the danger of marring the fruit in removing the pits or portions thereof.

A further purpose is to prevent wastage of the meat of the fruit in the process of removing the pit.

A further purpose is to manipulate, cut and pit the fruit while it is impaled upon pins of chain conveyors which hold the severed portions of the fruit and move them away from the location of pitting.

Further purposes appear in the specification and in the claim.

In the drawings we have chosen to illustrate only one of the many embodiments in which our invention may appear, choosing the form from the standpoints of convenience of illustration, satisfactory operation and clear demonstration of the principles involved.

Figure 1 is a diagrammatic top plan view of the fruit pitter of our invention omitting the drive.

Figure 2 is a side elevation of Figure 1.

Figure 3 is a top plan view of the fruit chute which is shown for placement purposes in Figures 1 and 2.

Figure 4 is a side elevation of the fruit chute of Figure 3.

Figure 5 is a fragmentary perspective of the separator in Figures 1 and 2.

Figure 5a is an enlarged fragmentary section on the line 5a—5a of Figure 1.

Figure 6 is a fragmentary diagrammatic perspective of the cutters of Figures 1 and 2.

Figure 7 is a detail perspective of the extractors which are seen in Figure 1.

Figure 8 is a top plan view of the drive which has been omitted in Figures 1 and 2.

Figure 9 is a side elevation of the drive of Figure 8.

Figure 10 is a detailed central longitudinal section of the clutch operating member in Figures 8 and 9.

Figure 11 is a section of Figure 10 on line 11—11.

Figure 12 is a section of Figure 10 on the line 12—12.

In the drawings like numerals refer to like parts.

Describing in illustration but not in limitation and referring to the drawings:

In the prior art, various expedients are employed in removing the pits of peaches, plums, apricots and the like, which have a single stone or pit in the approximate center of a fruit of substantial size. Many of these prior art devices have involved fairly complicated equipment which is not always reliable, and which in some cases seriously mars the fruit or removes a considerable amount of the meat of the fruit in the process of removing the pit.

In accordance with our invention, we have constructed a fruit pitter which can be made cheaper to a considerable extent from standard parts, and it will be very reliable and effective while at the same time producing little damage on the fruit and little loss of the meat incident to pitting.

We preferably employ chain conveyors, mounting pins or the like which serve to engage, support and manipulate the fruit and force out the pit. When reference is made herein to a chain conveyor, it will be understood that any suitable conveyor of this character may be employed, whether the individual conveyor is actually known in the trade as a chain, link, belt or other conveyor. For greatest convenience in inspection, we operate the chain conveyors horizontally, although it will be understood that some other direction of motion may be used.

As best seen in Figures 1 and 2, the cooperating conveyors 21 and 22 are moving on driving sprockets 23 and 24 and idling sprockets 25, 26 and 27, 28, respectively mounted on shafts 29, 30, 31 and 32, 33, 34 in suitable bearings not shown, in a frame 35.

The conveyors have converging stretches 36 and 37 between the respective idlers 25, 26 and 27, 28, and diverging stretches 38 and 39 between the respective sprockets 26, 23 and 28, 24, and return stretches 40 and 41 at the back.

Mounted on the outside of the conveyors and projecting toward one another at the converging and diverging stretches, we provide pins 42, suitably in two rows 43 and 44 on each conveyor, the proximity of each pin to the adjoining pins being such that the pins are closer than the corresponding dimension of the pit, so that the pit could not fail to be engaged by one of the several pins as later explained.

In order to assure most effective use of the pins in removing the pits, the pins in the respective rows 43 and 44 are slightly staggered as best seen at 45 and 46 in Figure 2, so that each lower pin is not exactly below each upper pin. To avoid confusion in the drawing, this staggered relation is not shown in Figure 1.

Likewise pins on the opposite conveyors are staggered with respect to one another as shown in Figure 1 where each pin on one conveyor is slightly out of phase with respect to a corresponding pin on the other conveyor.

In order to permit the conveyors to move around the sprockets the pins are suitably mounted on the links in any well known manner, preferably removable, so that they fan out as the conveyors go around the sprockets as shown at 47 in Figure 1.

The lengths of the pins are such that at the points of closest proximity of the conveyors 48 and 49 the ends of the pins fail to meet by a distance 50 which is at least as great as the corresponding dimension of the pit so that in this position the pit cannot become jammed between the pins, but enough space is provided to allow the pit to pass through.

Fruit such as peaches or the like enters through a chute 51 having a converging portion 52 and a downwardly extending channel 53 hinged thereto at 54. Thus if fruit is coming too fast or if a stoppage is encountered, the flow of fruit can be cut off simply by lifting the channel 53 about the hinge 54 and holding it up so that the fruit cannot enter the machine. The bottom end of the channel 53 is desirably located at 55 between the converging stretches 36 and 37 for conveyors so that as the fruit leaves the channel 53 it will immediately roll into the converging jaw formed by the pins and be impaled on the pins between the pins 48 and 49. Therefore the spacing between the pins 48 and 49 should be approximately the diameter of the fruit but not greatly in excess thereof. A cutter 56 is provided at the beginning of the diverging stretches of the conveyors, to separate the fruit as the conveyors begin to move apart. The cutter suitably comprises rotary cutter members 57 and 58 pivoted on shafts 59 and 60. The pivots are mounted on arms 61 and 62 respectively pivoted at 63 and 64 on the frame above and below the level of the conveyor. Stop projections 65 and 66 from the arms engage fixed stop surfaces 67 and 68 so that the arms 61 and 62 cannot move close enough together to bring the blades actually into contact. Blades are, however, directed to come very close together. A spring 69 biases the blades toward one another.

Gears 70 and 71 on the pivot shafts 59 and 60 engage racks 72 and 73 of suitable arcuate formation, so that the cutter blades rotate whenever the pivots 59 and 60 are forced apart by pressure between the blades or whenever blades move toward one another by virtue of overcoming such pressure. This is found to be very important as the blades must pass the pit which normally will ride at the center of the fruit and will separate the blades even though the spring might be strong enough to bring them together upon the pit. Also we find that the action of the cutters in contacting the pit helps to work the pit loose.

The rotation of the blades is very important because the skin of many fruits such as apricots is tough enough so that it is very difficult to cut without substantial relative movement between the knife and the fruit. A stationary cutter is therefore not effective.

Located beyond the cutter we provide a separator or divider 74 of wedge formation having sharp points 75 and 76 one above and one below the pit located facing toward the oncoming fruit with the points 75 and 76 at the line of separation which has been cut by the cutters. Between the points 75 and 76 a mouth 77 is provided of a pit channel 78 having a deflecting vane 79 and a downward passage 80 into any suitable receptacle.

If desired, as shown in Figure 5, a horizontal knife 75' beyond the separator or divider cuts the fruit into quarters. This feature is optional, and is not shown on other views.

Beyond the separator or divider an extractor 81 or 82 having a prong 83 extending into the space between the two lines of pins 43 and 44, opposite to the direction of the motion of the fruit and the conveyor, having diagonal extending deflecting portions 84 which hold the fruit out from the pins. It will be understood that the extractor can in removing the fruit tend to make it fall flat side down or the round side down if either is desired for inspection, but this is regarded as a matter of indifference in most cases.

It is usually most convenient to arrange the machines in banks with several pitters operating from the same drive. Because of this arrangement it is very inefficient to shut down the drive in case of stoppage in a single machine. Accordingly we provide as shown in Figures 8 and 9 a drive which is individual to each conveyor. A frame 85 receives the entire pitting machine which conveniently rests in angles shown at 86, with the uprights 87 into the end angles 88. The shafts 29 and 32 for the driving sprockets are in line with shafts 89 and 90 for gears 91 and 92 inter-geared with one another and suitably driven by other gearing not shown. The shafts 89 and 90 are mounted in bearings 93 or brackets 94 from the frame 85. At the lower end of each shaft 89 and 90 is a clutch member 95 longitudinally slotted at 96 to receive a pin 97 on the shaft 89 or 90, permitting longitudinal movement of clutch 96 with respect to the shaft 89 or 90. The clutch member is also central bored at 98 to pass the shaft 90. At the lower end the clutch member has clutch-gripping prongs 99 which engage in radial slots 100 on the sprockets 23 and 24 when the clutch is engaged. The clutch member is provided with rings 101 and 102 which ride a pin 103 or a clutch-operating lever 104 pivoted at 105 and having a handle 106, so that the clutch can be moved in and out to engage or disengage.

In operation, it will be understood that fruit coming down the chute will move into the converging portion between the conveyors and will be perforated from the opposite sides by the pins approaching on the conveyors. The pins will at first merely carry the fruit, but as the pins move closer together they will engage the pit, and as the fruit is cut into pieces or halves the pins will push out the pit. The staggering of the pins on a single conveyor and in the operation of one conveyor to the other makes sure that the pit will be engaged by one or more pins no matter which side of the fruit it adheres to. The pins will furthermore position and carry forward the separated halves to the point where they are to be extracted by the extractor. The pins are desirably smooth so that they will not appreciably mar the fruit and where they are made smooth as is characteristic of needles they can be withdrawn without any puncture point being evident, particularly after the fruit is skinned. Where desired the pins may be even as smooth as hypodermic needles, and the danger of breakage is not too serious as the pins can be individually detachable and replaceable.

The fruit as it enters the cutters causes them to move apart and at the same time rotate the pit passing between the two cutters. As the fruit moves between the cutters it is cut, the rotation giving rotative movement over the surface of the skin of the fruit so that the cutters can open toward a fruit having a tough skin. Where the spring is adequately adjusted so that the cutters ride over and in contact with the pit, we find that they help to work the pit loose.

The separators or dividers force the halves of the fruit apart, pull the pit if it has not already been dislodged completely by the pins and cutters, and may even be used to cut the fruit where the skin is not unduly tough, in which case the knives 56 may be removed. In order to perform this function it is important that the points in the wedge of the separators or dividers which first contact the fruit be very sharp.

In case of emergency because, for example, of foreign material entering the machine, by opening or breaking of a component part, breaking of a pit or the like, the flow of the fruit can readily be stopped by lifting up the channel of the chute, and the drive of either or both conveyors may be stopped by disengaging an appropriate clutch.

In view of our invention and disclosure variations and modifications to meet individual whim or particular need will doubtless become evident to others skilled in the art, to obtain all or part of the benefits of our invention without copying the process and structure shown, and we, therefore, claim all such insofar as they fall within the reasonable spirit and scope of our claim.

Having thus described our invention what we claim as new and desire to secure by Letters Patent is:

In a fruit pitter, a pair of endless conveyors arranged in substantially the same plane and having adjoining opposed converging stretches followed by adjoining opposed diverging stretches, means for feeding fruit into the space between the converging stretches, pointed pins of a length of substantially half the diameter of the fruit being pitted mounted on the conveyors, the pins on each conveyor being spaced from each other a distance substantially less than the diameter of a fruit pit and protruding in opposed relation toward the pins on the other conveyor, means for cutting the fruit to halve the same positioned in close proximity to the pointed ends of the opposed pins and mounted in a plane at substantially right angles to the plane of the conveyors and pins and adjacent the position of greatest convergence of the pins, a separator of generally wedge formation positioned beyond the cutting means between the diverging stretches and having abruptly diverging walls followed by more gradually diverging walls opposed to and in close proximity to the ends of the pins, the more gradually diverging walls being provided on each side with a pit channel aligned with the pins and into which the pit is pressed by the pins while the fruit half cut surface slides over the diverging walls as the fruit is fed by the pins and means for driving the conveyors in unison.

WILLIAM J. KRUSE.
CONRAD E. KRUSE.

REFERENCES CITED

The following references are of record in the file of this patent:

UNITED STATES PATENTS

| Number | Name | Date |
|---|---|---|
| 794,598 | Dukley | July 11, 1905 |
| 1,292,261 | Clifford | Jan. 21, 1919 |
| 1,522,660 | Whitside | Jan. 13, 1925 |
| 1,600,567 | Roberts | Sept. 21, 1926 |
| 1,822,381 | Smith | Sept. 8, 1931 |
| 1,992,995 | Denner et al. | Mar. 5, 1935 |
| 2,314,066 | Ballou et al. | Mar. 16, 1943 |
| 2,474,492 | Perrelli et al. | June 28, 1949 |